United States Patent [19]
Kuba et al.

[11] Patent Number: 5,467,205
[45] Date of Patent: Nov. 14, 1995

[54] IMAGE DISPLAY SYSTEM WITH RIGHT AND LEFT EYE ILLUMINATING MEANS

[75] Inventors: Keiichi Kuba, Hachioji; Takayoshi Togino, Koganei, both of Japan

[73] Assignee: Olympus Optical Co., Ltd., Tokyo, Japan

[21] Appl. No.: 231,669

[22] Filed: Apr. 25, 1994

[30] Foreign Application Priority Data

Apr. 28, 1993 [JP] Japan .................................. 5-102815

[51] Int. Cl.[6] .............................................. G02F 1/1335
[52] U.S. Cl. .......................... 359/40; 359/630; 359/633
[58] Field of Search ............................... 359/40, 83, 63, 359/630, 631, 633, 473, 476; 345/8; 351/158; 348/42

[56] References Cited

U.S. PATENT DOCUMENTS

| | | | |
|---|---|---|---|
| 4,561,723 | 12/1985 | Hamano et al. | 359/40 |
| 5,129,716 | 7/1992 | Holakovszky et al. | 351/50 |
| 5,392,158 | 2/1995 | Tosaki | 359/633 |

FOREIGN PATENT DOCUMENTS

| | | | |
|---|---|---|---|
| 0551781 | 7/1993 | European Pat. Off. | 359/40 |
| 3191389A | 8/1991 | Japan . | |
| 426289A | 1/1992 | Japan . | |

Primary Examiner—Anita Pellman Gross
Assistant Examiner—James A. Dudek
Attorney, Agent, or Firm—Stevens, Davis, Miller & Mosher

[57] ABSTRACT

An image display system wearable on the user's head is disclosed for displaying a magnified projected image. The image display system includes an image display element for displaying an image thereon, a right eye ocular optical system for forming a light path leading an image formed on the image display element onto the right eye of the viewer, a left eye ocular optical system for forming a light path leading an image formed on the image display element onto the left eye of the viewer, thereby viewing a spatially enlarged projection of the image by both the right and left eye ocular optical systems. The right eye ocular optical system for leading the image from the LCD 1 to the right eye 5R includes a half-mirror 3R and a convex lens 4R. The left eye ocular optical system for leading the image to the left eye 5L includes a half-mirror 3L and a convex lens. The LCD 1 is placed at a position at substantially equal distance from the right and left eyes. In order to illuminate the LCD 1, the right eye illuminating system 2R is placed at the side of the left ocular optical system, and the left eye illuminating system 2L is placed at the side of the right eye ocular optical system. The LCD 1 is illuminated by the pencil of rays from the right and left eye illuminating means, alternately, thereby leading the image time-divisionally to the right and left eyes 5L, 5R of the viewer.

8 Claims, 8 Drawing Sheets

FIG_1
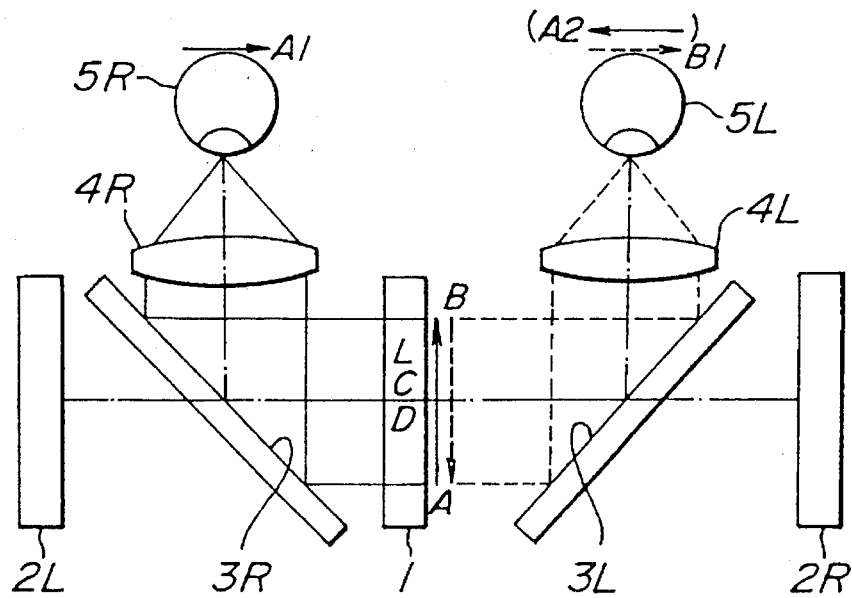
FIG_2
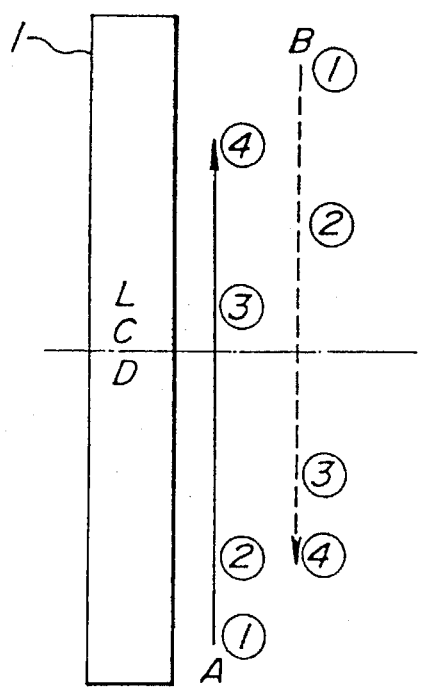

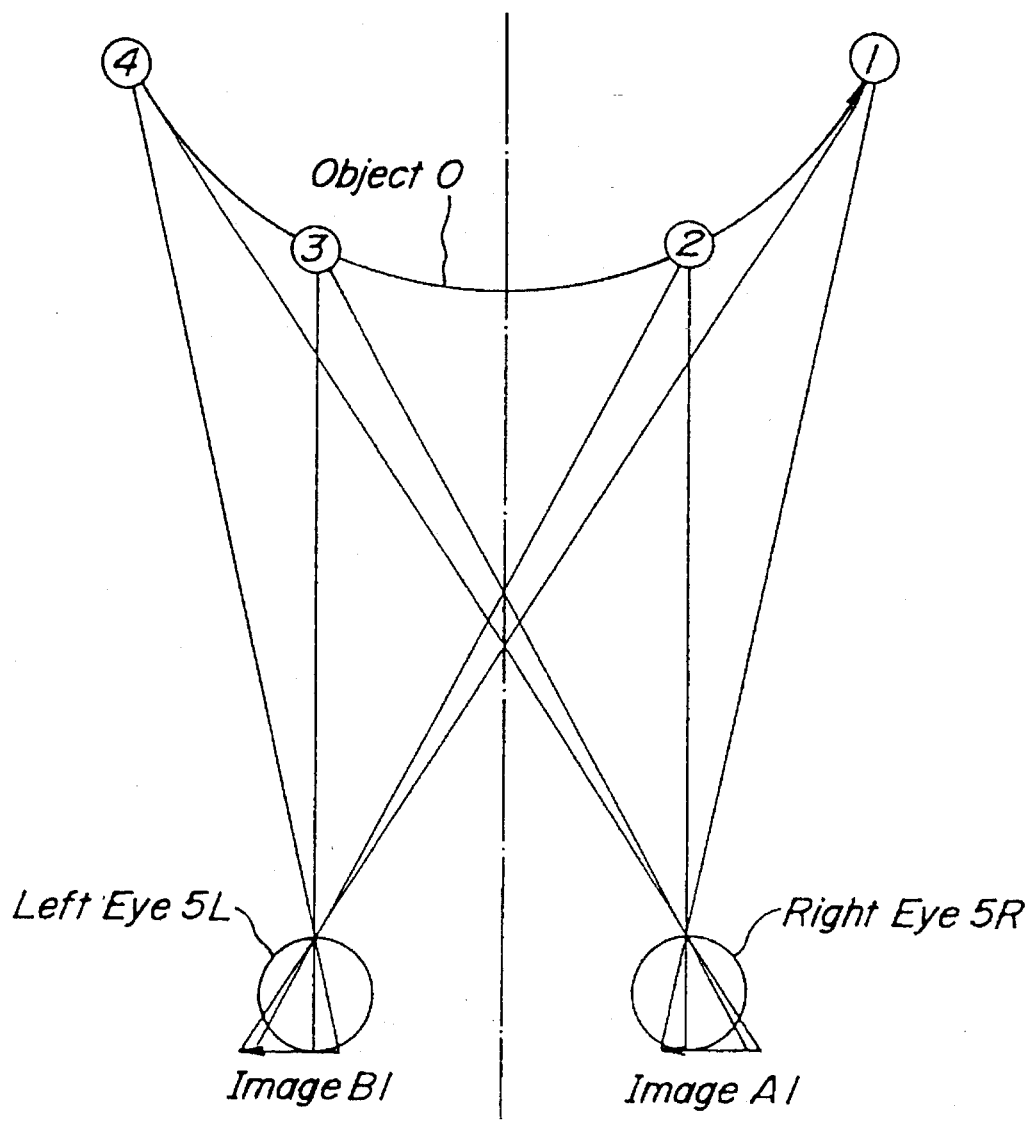
FIG_3

FIG_4
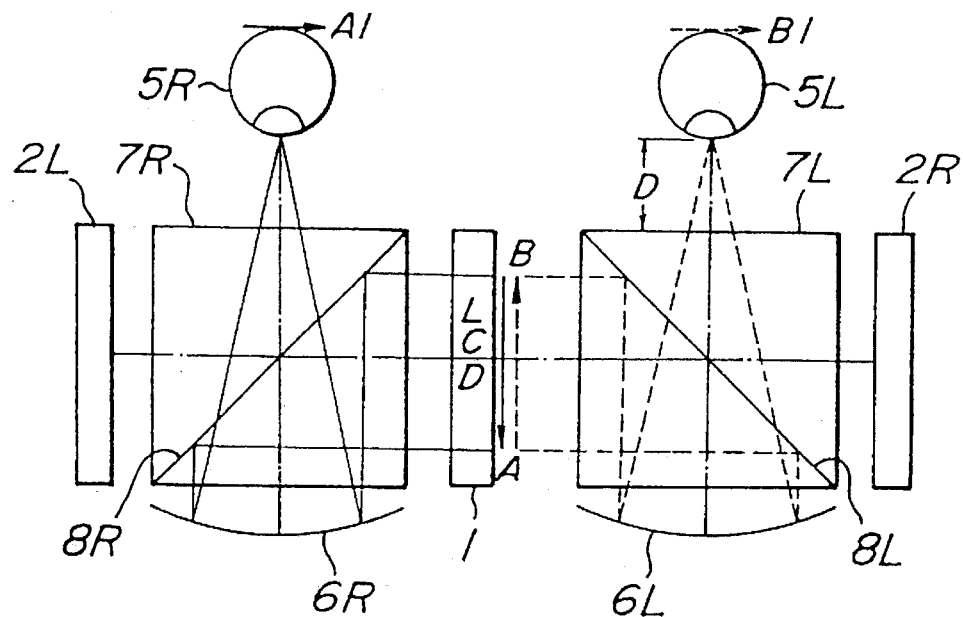
FIG_5
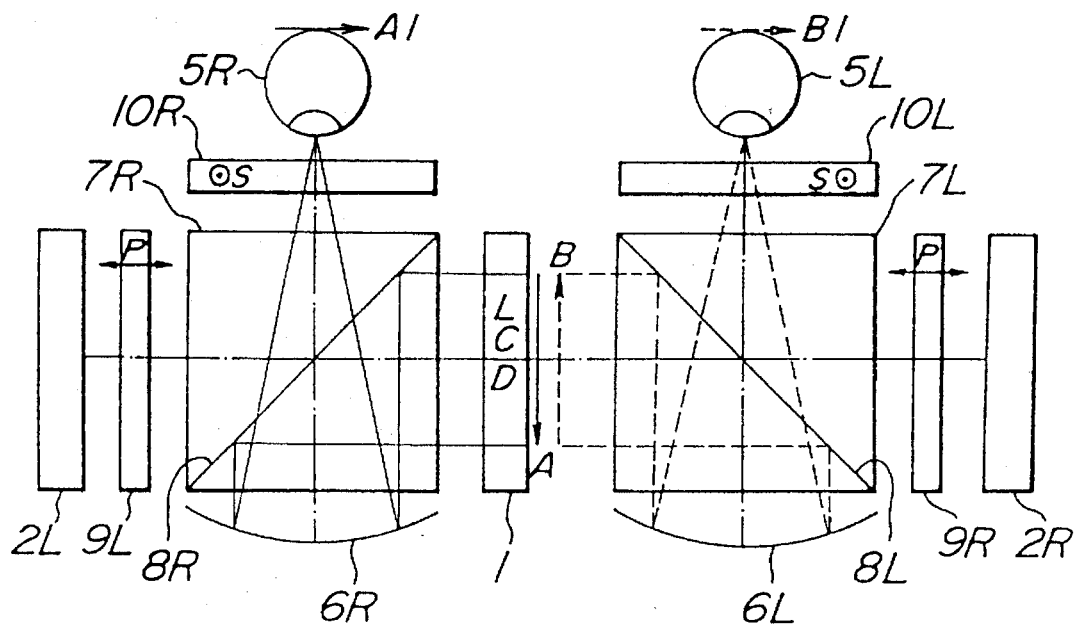

FIG_6
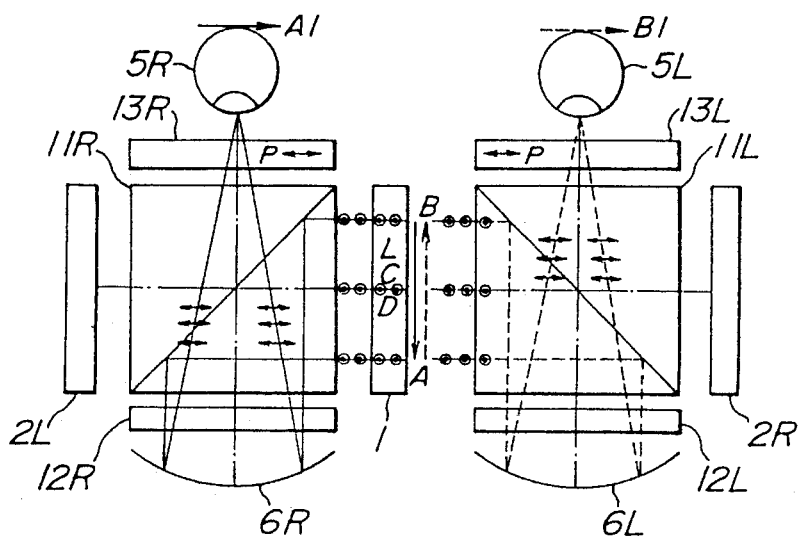
FIG_7a  FIG_7b  FIG_7c  FIG_7d
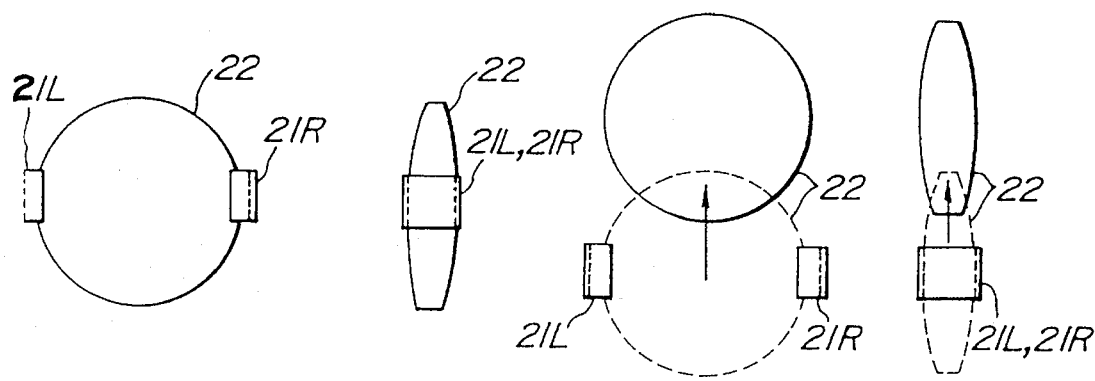

FIG_8a
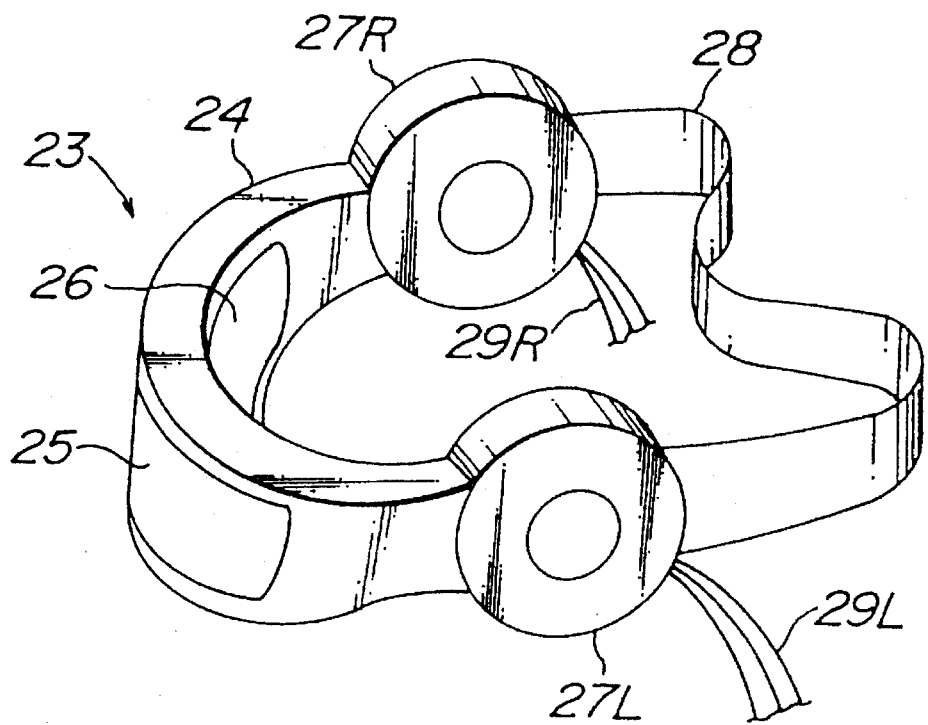
FIG_8b
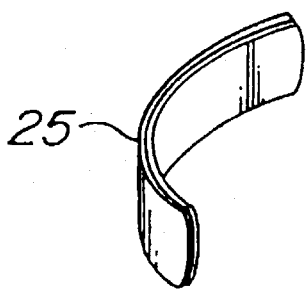
FIG_8c
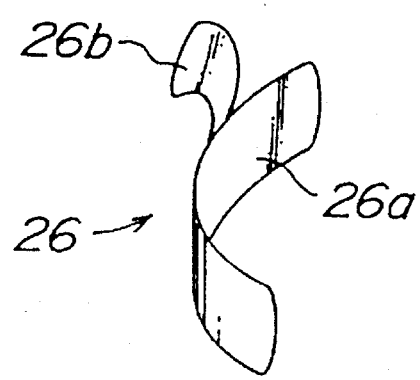

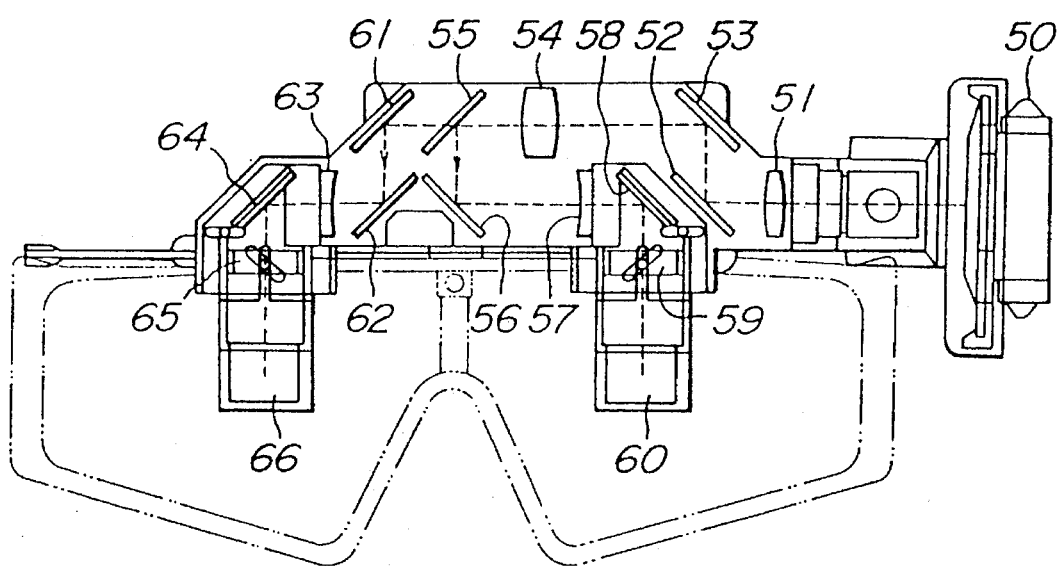
FIG_10  PRIOR ART

FIG_11 PRIOR ART
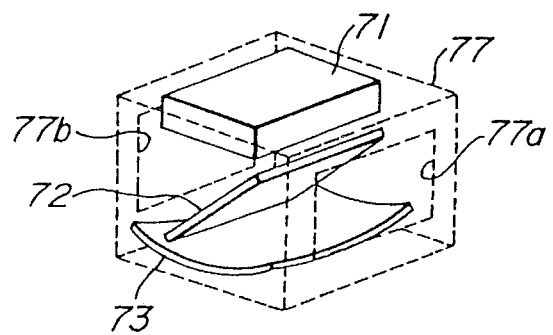
FIG_12
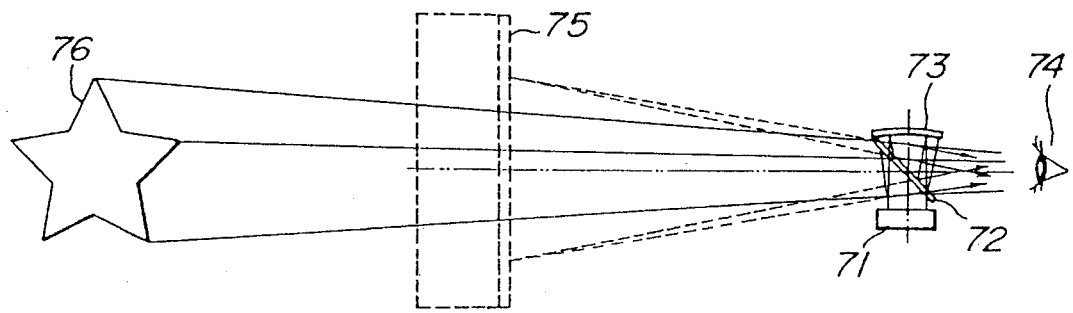

1

IMAGE DISPLAY SYSTEM WITH RIGHT AND LEFT EYE ILLUMINATING MEANS

BACKGROUND OF THE INVENTION

1. Field of the Invention

The present invention relates to an image display system capable of displaying an image on the right and left eyes of a viewer.

2. Related Art Statement

Such a system for displaying an image on the right and left eyes of a viewer has been disclosed in, for example, Japanese Patent Opened No. 26,289/92.

The construction of such an image display system described in Japanese Patent Opened No. 26,289/92 is shown in FIG. 10. In this system, use is made of one liquid crystal display (hereinafter referred to as an LCD) 50 as an image displaying element. An image (pencil of rays) displayed on the LCD 50 is incident on a half-mirror 55 through a lens 51, mirrors 52, 53 and a lens 54. Then in the right eye system, on the one hand, the pencil of rays is reflected by the half-mirror 55 and reaches the right eye through mirrors 56, a lens 57, a mirror 58, a lens 59 and a mirror 60, and in the left eye system, on the other hand, the pencil of rays is transmitted through the half-mirror 55 and reaches the left eye through mirrors 61, 62, a lens 63, a mirror 64, a lens 65, and a mirror 66.

In the above conventional image display system, use is made of an LCD placed at the position in front of and deviated from the eyes as an image display system. The image displayed on the LCD is split into two portions for right and left eyes by the half-mirror and led to both eyes of the viewer, so that it is necessary to provide a common light path for right and left paths and splitting light paths after the half-mirror as well as to provide a large number of optical elements such as lens and mirrors or the like in the respective light paths so as not to invert the image. Moreover, a part of the light path is superimposed so that the light system becomes complicated and thus to overall system becomes large, of resulting in an increase of weight. Such a conventional image display system is, therefore, not suitable as an image display system worn on the head.

The image display system for displaying a magnified image has been disclosed in, for example, Japanese Patent Opened No. 191,389/91.

The construction of such an image display system described in Japanese Patent Opened No. 191,389/91 is shown in FIG. 11.

Such an image display system comprises a display section 71, a half-mirror 72 and a magnifying mirror 73. The display section 71 displays the contents of the image information outputted from the image information output means of a computer (not shown) or the like. The display section 71 is provided on the upper portion of a housing 77 constituting the outline of a shell of the display system, so as to direct the display surface of the display section downward. The magnifying mirror 73 is placed under the housing 77 in such a manner that the reflection surface of the mirror 73 is opposite to the display surface of the display section. The magnifying mirror 73 is bent along two axes in such a manner that a magnified image 75 of the image displayed on the display surface of the display section 71 and obtained by the construction shown in FIG. 12 is magnified uniformly in all directions. The half-mirror 72 is placed between the display section 1 and the magnifying mirror 73 with an inclination of 45° to its display surface.

In this case, the optical axis of the magnifying mirror 73 passes through the center of the half-mirror 72 and the center of the display section 71 perpendicular to the display surface of the display section 71. The dimensions of the magnifying mirror 73 and the half-mirror 72 are set in such a manner that the image displayed on the display section 71 can be reflected without discontinuation. According to such construction of the display system, a part of the light emanating from the display section 1 is transmitted through the half-mirror 72, and reflected by the magnifying mirror 73 and then again returned to the half-mirror 72. A part of the light incident on the half-mirror 72 is reflected by the half-mirror 72 in one direction perpendicular to the optical axis of the magnifying mirror 73 and reaches the eye of an operator 74. A part of the light emanating in the above one direction from an object 76 in the background present in the other direction perpendicular to the optical axis of the magnifying mirror 73 is transmitted through the half-mirror 72 and reaches the eye of the operator 74.

At a side surface of the housing 77 in the above one direction, a light transmission opening 77a for passing through the pencil of rays emanating from the half-mirror 72 to the operator 74 is provided. While at a side surface of the housing 77 opposite to the light transmission opening 77a, a light transmission opening 77b for passing through the pencil of rays emanated from the object 76 present in the background to the half-mirror 72 is provided.

Such a conventional image display system is constituted to be able to observe the images on the display surface and the background, simultaneously, so that it is completely different in construction from the image display system wearable on the head.

SUMMARY OF THE INVENTION

It is an object of the present invention to eliminate the above described disadvantages of the conventional image display system.

It is another object of the present invention to provide a compact and inexpensive image display system by illuminating one image display element placed at the position at substantially equal distance in front of the right and left eyes alternately from right and left sides, and by leading the image onto the right and left eyes of the viewer, alternately.

According to the present invention, there is provided an image display system comprising an image display element for displaying an image thereon, a right eye ocular optical system for forming a light path leading an image formed on the image display element onto the right eye of the viewer, a left eye ocular optical system for forming a light path leading an image formed on the image display element onto the left eye of the viewer, thereby viewing a spatially enlarged projection of the image by the both ocular optical systems, the image display element being provided at the position at substantially equal distance from the right and left eye ocular optical systems, a right eye illuminating means provided at the side of the left eye ocular optical system, and a left eye illuminating means provided at the side of the right eye ocular optical system, in order to illuminate the image display element, whereby the image is time-divisionally led to the right and left eyes of the viewer by illuminating the image display element with pencil of rays from the right and left eye illuminating means alternately.

According to the present invention, since the image display element is provided at the position at substantially equal distance from the right and left ocular optical systems, the image is led time-divisionally to the right and left eyes of the viewer by illuminating alternately the image display element with the pencil of rays from the right and left eye illuminating means so that the viewer can observe a spatially enlarged projection of the image.

In this case, since the image display element is illuminated time-divisionally, even if parts of the right and left eye ocular optical systems are superimposed, the right and left eye ocular optical systems can be constructed so as a not to interfere to each other, so that respective ocular optical systems can be constructed by a small number of optical elements, such as lens, mirror or the like, thus resulting in a very simple optical system. As a result system can be down-sized, light-weighted and low cost, as well as being an image display system suitable for being worn on the head.

In an embodiment of the image display system according to the present invention, the illuminating light incident on the optical system and not passing through the image display element is shielded by using a polarizing element.

In a preferable embodiment of the image display system according to the present invention, the light for illuminating the LCD is polarized. The image display system is a head-mounted type.

In a further preferable embodiment of the image display system according to the present invention, the right and left eye ocular optical systems include half-mirrors, respectively. The right and left eye ocular optical systems include a concave mirror and a half-mirror, respectively. The half-mirror is included in a prism. The prism is formed by plastics.

BRIEF DESCRIPTION OF THE DRAWINGS

FIG. 1 is a plan view showing a first embodiment of an image display system according to the present invention;

FIG. 2 is an explanatory view showing the case using the image display system of the first embodiment as a stereoscopic vision;

FIG. 3 is an explanatory view showing the case using the image display system of the first embodiment as a stereoscopic vision;

FIG. 4 is a plan view showing a second embodiment of the image display system according to the present invention;

FIG. 5 is a plan view showing a third embodiment of the image display system according to the present invention;

FIG. 6 is a plan view showing a fourth embodiment of the image display system according to the present invention;

FIGS. 7a to 7d are explanatory views showing a convex lens holding mechanism applicable to the image display system having a convex lens in the optical system;

FIGS. 8a to 8c are perspective views showing the image display system wearable on the head as a goggle type and detailed construction of the guard cover;

FIG. 10 is a front view showing a construction of one conventional image display system;

FIG. 11 is a perspective view showing a construction of another conventional image display system; and FIG. 12 is an explanatory view showing the principle of the system shown in FIG. 11.

DETAILED EXPLANATION OF THE PREFERRED EMBODIMENT

Figure 9A:
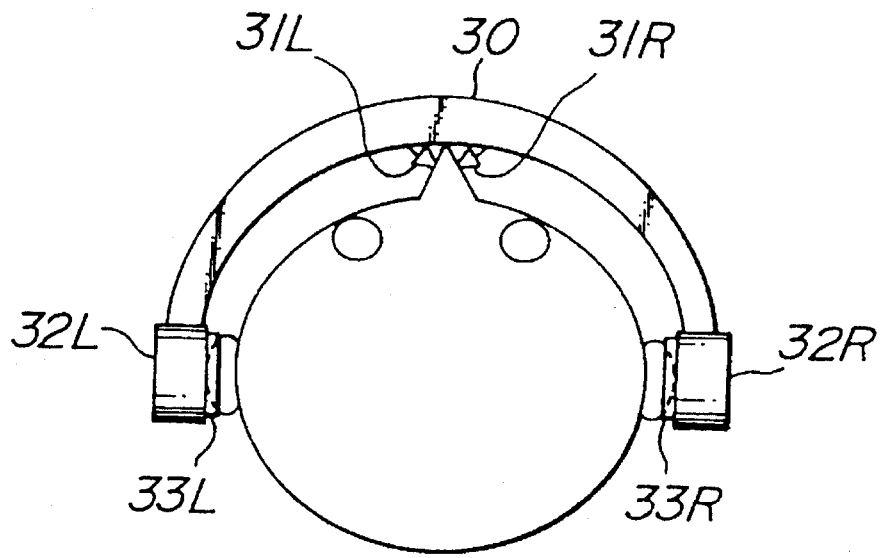
FIGS. 9a and 9b provide a plan view showing the image display system worn on the head and having added face contacting members and a cross-sectional view showing the headphone section.

In to the drawings, there are shown various embodiments of an image display system according to the present invention. Like parts are shown by corresponding reference characters throughout several views of the drawings.

Embodiment 1

FIG. 1 is a plan view showing a first embodiment of the image display system according to the present invention.

As shown in FIG. 1, the image display systems of the first to fourth embodiments are constructed as a goggle type image display system as shown in, for example, FIG. 8, so as to down-size the whole system taking the construction wearable on the head into consideration.

In this embodiment, optical systems of both the right and left eyes are constructed symmetrically in the horizontal directions. That is, the image display system comprises a liquid crystal panel (LCD) 1 as an image display element in common in right and left directions and placed at the position at substantially equal distance from the right and left eyes of the viewer in front thereof in case of wearing it on the head. The system further includes a right eye illuminating system 2R, a half-mirror 3R constituting a right eye ocular optical system, a convex lens 4R, a left eye illuminating system 2L, a half-mirror 3L constituting a left eye ocular optical systems, and a convex lens 4L. In FIG. 1, the image display system is placed opposite to the viewer, so that the right and leftf eyes 5R and 5L are represented in inverted relation to the right and left of the drawing's plane.

In the first embodiment, the image is alternately formed on the right eye 5R and the left eye 5L of the viewer as follows. That is, at a certain time, an image A shown by a solid line is displayed on the LCD 1, and the pencil of rays is illuminated on the LCD 1 through the half-mirror 3L from the right side of the paper plane, so that the shown image A1 is formed on the retina of right eye 5R through the half-mirror 3R and the convex lens 4R. In this case, if the left eye illuminating system 2L is driven simultaneously, unnecessary inverted image A2 is formed on the retina of the left eye 5L, so that the left eye illuminating system 2L must be put in the OFF condition surely.

At the next time, an image B shown by a dash line is displayed on the LCD 1, and the pencil of rays is illuminated on the LCD 1 through the half-mirror 3R from the left side of the paper plane, so that the shown image B1 is formed on the retina of left eye 5L through the half-mirror 3L and a convex lens 4L. In this case, also the right eye illuminating system 2R is put in the OFF state.

By alternately repeating in a time-divisional mode such actions of (1) forming image A and driving the right eye illuminating system 2R and (2) forming image B and driving the left eye illuminating system 2L, an image display system is provided, which is small in size, light-weight and inexpensive and which uses a simplified optical system with only one LCD 1 which forms images A1,B1 on the retinas of the right and left eyes of the viewer, resulting in a capability of viewing the image with binocular vision.

In the above construction of the first embodiment, if the images A,B of the right and left eyes displayed on the LCD 1 cause right and left parallaxes as shown in FIG. 2, the viewer can recognize the portions numbered ① to ④ of the images A and B with a corresponding relation shown in FIG.

3 and thus recognize an object O having a certain depth, so that a stereoscopic vision can be obtained.

Embodiment 2

FIG. 4 shows a construction of a second embodiment of the image display system according to the present invention. Like parts are shown by corresponding reference characters in FIGS. 1 and 4.

The image display system of the second embodiment comprises concave mirrors 6L,6R and prisms 7L,7R instead of half-mirrors 3L,3R and convex lenses 4L,4R. The other portions of the system are the same as those of the first embodiment, so that its detailed description is omitted.

In this second embodiment, the image is alternately formed on the right eye 5R and the left eye 5L of the viewer as follows. That is, at a certain time, when an image A shown by a solid line is displayed on the LCD 1, and the pencil of rays is illuminated on the LCD 1 from the right side of the paper plane by driving only the right eye illuminating system 2R, a part of the pencil of rays is then reflected by the half-mirror surface 8R of the prism 7R, and made incident on the concave mirror 6R. The part of the pencil of rays is then enlarged and reflected by the concave mirror 6R, and made incident on the prism 7R. A part of the incident pencil of rays is transmitted through the half-mirror surface 8R of the prism 7R and imaged on the retina of the right eye 5R, thereby forming an image A1 shown in FIG. 4.

Then, when an image B shown by a dashed line is displayed on the LCD 1, and the pencil of rays is illuminated on the LCD 1 from the left side of the paper plane, by driving only the left eye illuminating system 2L, a part of the pencil of rays is then reflected by the half-mirror surface 8L of the prism 7L and made incident on the concave mirror 6L. The part of the pencil of rays is then enlarged and reflected by the concave mirror 6L, and made incident on the prism 7L. A part of the incident pencil of rays is transmitted through the half-mirror surface 8L of the prism 7L and imaged on the retina of the right eye 5L, thereby forming an image B1 shown in FIG. 4.

By alternately repeating in a time-divisional mode such actions of (1) forming image A and driving the right eye illuminating system 2R and (2) forming image B and driving the left eye illuminating system 2L, an image display system is provided, which small in size, light-weight and inexpensive, which uses a simplified optical system with only one LCD 1 and which forms images A1,B1, in which chromatic aberration has been decreased, on the retinas of the right and left eyes of the viewer, thus resulting in a capability of viewing the image with binocular vision.

In this second embodiment, moreover, prisms 7L,7R are placed on a light path between the LCD 1 and the concave mirrors 6L,6R, respectively, so that a major part of the light path from the LCD 1 to the right and left eyes 5L,5R of the viewer is passed in the medium of optical glass or optical plastic having a refractive index which is =about 1.4~1.9. Since the length of the light path in the case of passing the pencil of rays in the medium of such a refractive index n is 1/n times that in the case of passing the pencil of rays in the air, the length of the light path transmitting in the prisms 7L,7R becomes 1/n times that in air. Therefore, even though the focal length is made short in order to make a field angle large, the distance (shown in FIG. 4 by D) from the right and left eyes 5L,5R of the viewer to the prisms 7L,7R can be surely obtained, so that the image display system a having wide field angle can be obtained.

Embodiment 3

FIG. 5 shows a construction of a third embodiment of the image display system according to the present invention. Like parts are shown by corresponding reference characters in FIGS. 4 and 5.

The image display system in this third embodiment comprises a TN liquid crystal LCD which has no polarizing plate at its surfaces (the right and left surfaces in FIG. 5), instead of an LCD of conventional type having polarizing plates at its surfaces, as an LCD 1, and polarizing plates 9R,9L,10R, 10L having P polarizing characteristic and S polarizing characteristic and inserted between the right eye illuminating system 2R and the prism 7L, the left eye illuminating system 2L and the prism 7R, the prism 7L and left eye 5L, and the prism 7R and right eye 5R, respectively. The other portions of the system are the same as those of the second embodiment, so that its detailed description is omitted.

In this third embodiment, the image is formed on the right eye 5R and the left eye 5L of the viewer as follows. That is, at a certain time, an image A shown by a solid line is displayed on the LCD 1 and the pencil of rays is illuminated on the LCD 1 from the right side of the paper plane, by driving only the right eye illuminating system 2R. The pencil of rays is then transmitted through the polarizing plate 9R and inverted to P polarizer component and then made incident on the prism 7L. The P polarizing component of the light reflected on the half-mirror surface 8L proceeds in the direction of left eye 5L, but is shielded by the polarizing plate 10L which transmits only S polarizer component, so that the P polarizer component does not reach the left eye 5L.

The P polarizer component of the light transmitted through the half-mirror surface 8L is converted into an S polarizer component in case of transmitting through the LCD 1 of TN liquid crystal type and incident on the prism 7R. The S polarizer component of the light transmitted through the half-mirror surface 8R is shielded by the polarizing plate 9L, but the S polarizer component reflected on the half-mirror surface 8R is incident on the concave mirror 6R. This S polarizer component incident on the concave mirror 6R is then enlarged and reflected by the concave mirror 6R, and made incident on the prism 7R. A part of the incident S polarizer component is transmitted through the half-mirror surface 8R of the prism 7R and the polarizing plate 10R and imaged on the retina of the right eye 5R, thereby forming an image A1 shown in FIG. 5.

Then, when an image B shown by a dashed line is displayed on the LCD 1, and the pencil of rays is illuminated on the LCD 1 from the left side of the paper plane, by driving only the left eye illuminating system 2L, the pencil of rays is then transmitted through the polarizing plate 9L and converted into a P polarizer component and then made incident on the prism 7R. The P polarizer component of the light reflected on the half-mirror surface 8R of the prism 7R is shielded by the polarizing plate 10R, which transmits only the S polarizer component, before reaching the right eye 5R in the same manner as in the above discussion, but the P polarizer component transmitted through the half-mirror surface 8R is converted into an S polarizer component in case of transmitting through the LCD 1 of TN liquid crystal type and made incident on the prism 7L. A part of the incident S polarizer component is reflected on the half-mirror surface 8L of the prism 7L and enlarged and reflected by the concave mirror 6L, and then transmitted through the half-mirror 8L and the polarizing plate 10L and imaged on the retina of the right eye 5L, thereby forming an image B1 shown in FIG. 5.

By alternately repeating in a time-divisional mode such actions of (1) forming the image A and driving the right eye illuminating system 2R and (2) forming the image B and driving the left eye illuminating system 2L, the function and advantageous effect can be obtained in the same manner as the second embodiment. In addition, the pencil of rays from the right and left eye illumination systems 2L,2R as described above are incident on the right and left eyes 5L,5R directly, so that unnecessary light can be shielded.

Embodiment 4

FIG. 6 shows a construction of a fourth embodiment of the image display system according to the present invention. Like parts are shown by corresponding reference characters in FIGS. 5 and 6.

In this image display system of the fourth embodiment, the shielding of the pencil of rays directed to the eye from the right and left eye illuminating systems 2L,2R directly is realized by a construction different from the third embodiment. That is, in this embodiment, the optical system is constituted by using polarizing beam splitters 11L,11R of P polarizer component transmitting type, ¼ λ plates 12L,12R, and polarizing plates 13L,13R instead of prisms 7L,7R, polarizing plates 9L,9R and polarizing plates 10L,10R, which are utilized in the third embodiment.

In this fourth embodiment, the image is alternately formed on the right eye 5R and the left eye 5L of the viewer as follows. That is, at a certain time, when an image A shown by a solid line is displayed on the LCD 1 and the pencil of rays is illuminated on the LCD 1 from the right side of the paper plane, by driving only the right eye illuminating system 2R, the P polarizer component of the pencil of rays is transmitted through a polarizing beam splitter 11L of the P polarizing transmitting type, but the S polarizer component is reflected and directed to the polarizing plate 13L in front of the right eye 5L. In this case, the polarizing plate 13L is constructed as a P polarizing transmitting type (S polarizing reflection type), so that the reflected S polarizer component does not reach the left eye 5L.

The P polarizer component of the light transmitted through the polarizing beam splitter 11L is converted into an S polarizer component in case of transmitting through the LCD 1 of TN liquid crystal type and incident on the polarizing beam splitter 11L, so that this S polarizer component is fully reflected on the polarizing beam splitter 11L and incident on the concave mirror 6R through a ¼ λ plate 12R. This S polarizer component incident on the concave mirror 6R is then enlarged and reflected by the concave mirror 6R, and converted into a P polarizer component by passing through the ¼λ plate 12R again, so that this reconverted S polarizer component is transmitted through the polarizing beam splitter 11R and the polarizing plates 13R of polarizing transmitting type and imaged on the retina of the right eye 5R, thereby forming an image A1 shown in FIG. 6.

Then, when an image B shown by a dashed line is displayed on the LCD 1, and the pencil of rays is illuminated on the LCD 1 from the left side of the paper plane, by driving only the left eye illuminating system 2L, the S polarizer component reflected on the polarizing beam splitter 11L is then shielded by the polarizing plate 13R, which transmits only the P polarizer component, before reaching the right eye 5R in the same manner as in the above discussion, but the P polarizer component transmitted through the polarizing beam splitter 11L is converted into an S polarizer component in case of transmitting through the LCD 1 of TN liquid crystal type and imaged on the retina of the left eye 5L, thereby forming an image B1 shown in FIG. 6 in the same manner as in the above discussion.

By alternately repeating in a time-divisional mode such actions of (1) forming image A and driving the right eye illuminating system 2R and (2) forming image B and driving the left eye illuminating system 2L, the function and advantageous effect can be obtained in the same manner as the third embodiment, as well as the light quantity increasing effect can also be obtained as described hereinafter.

That is, in the case of the third embodiment, the pencil of rays emanated from the right eye illumination system 2R becomes ½ in the case of transmission through the polarizing plate 9R, the half-mirror surface 8L, in the case of reflection on the half-mirror 8R, and in the case of transmission through the half-mirror surface 8R, respectively, so that the quantity of light reaching the right eye 5R becomes (½)4=6.25% of the output of right eye illuminating system 2R. On the contrary, in the present embodiment, only the pencil of rays emanated from the right illuminating system 2R becomes ½ in case of transmitting the polarizing beam splitter 11L, so that the quantity of light reaching on the right eye 5R becomes 50% of the output of the right eye illuminating system 2R, and thus is greatly increased.

The above respective embodiments can be combined with the apparatuses shown in FIGS. 7 to 9. In this case, when the image display system of the present invention is used in the video system provided in an aircraft and the theater for using an image display system wearable on the head for exclusive use, sanitary use and maintenance such as cleaning or the like can be improved.

FIGS. 7a to 7d are explanatory views showing a convex lens holding mechanism capable of applying in the case that the convex lens is used in the optical system. This convex lens holding mechanism comprises as shown in FIGS. 7a (front view) and 7b (side view), a pair of right and left convex lens holders 21L,21R, which have a ⊐shaped cross-section and are connected to the housing of the image display system.

In this convex lens holding mechanism, as shown in FIGS. 7c and 7d, the convex lens can be removed very simply by sliding the convex lens from its attached condition shown by a dashed line to the upper position shown by a solid line.

FIG. 8a is a perspective view showing a whole construction of the image display system of goggle type wearable on the head. This image display system 23 comprises an optical system 24, guard covers 25,26 provided for ensuring clearness of view of the optical system, head phones 27L,27R, a belt 28 for attaching and fixing on the head, and lead wires 29L,29R for inputting video signals and audio signals from external devices. In this case, the guard covers 25,26 are formed detachably, so that they can be formed as disposable-type or reusable-type after cleaning and disinfecting. The guard cover 25 may, as shown in FIG. 8b, be a peeling-off-type cover using a lamination of a plurality of covers. As shown in FIG. 8c, moreover, a seal member 26b may be added the rear surface of the guard cover 26 in order to exchange the contacting portion 26a easily.

Figure 9B:
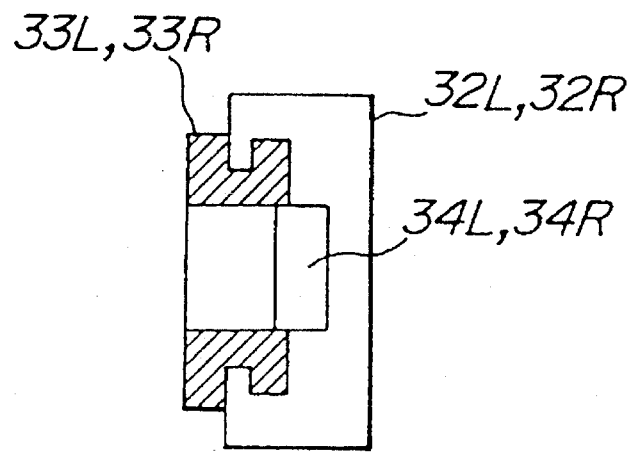

FIG. 9a is a plan view showing the condition of wearing the image display system having the added face contacting member on the head. This image display system is constructed by providing nose pads 31L,31R on a housing 30 of the optical system detachably and by providing sponges 33L,33R on the head phones 32L,32R detachably. In this case, as shown in FIG. 9b, the sponges 33L,33R are used by inserting them into the side of speakers 34L,34R of the head phones 32L,32R. The nose pads 31L,31R and sponges 33L,33R may be of the disposable type, or reusable type after cleaning and disinfecting, as well as being supported with magic tape (trade mark), double-sided adhesive tape or the like detachably.

What is claimed is:

1. An image display system comprising an image display element for displaying an image thereon, a right eye ocular optical system for forming a light path leading an image formed on the image display element onto the right eye of the viewer, a left eye ocular optical system for forming a light path leading an image formed on the image display element onto the left eye of the viewer, thereby viewing a spatially enlarged projection of the image by both the right and left eye ocular optical systems, the image display element being provided at a position at substantially equal distance from the right and left eye ocular optical systems, a right eye illuminating means provided at the side of the left eye ocular optical system, and a left eye illuminating means provided at the side of the right eye ocular optical system, in order to illuminate the image display element, whereby the image is time-divisionally led to the right and left eyes of the viewer by illuminating the image display element with pencil of rays from the right and left eye illuminating means alternately.

2. An image display system as claimed in claim 1, wherein the illuminating light incident on the optical system and not passing through the image display element is shielded by using a polarizing element.

3. An image display system as claimed in claim 2, wherein the light for illuminating the image display element is polarized.

4. An image display system as claimed in claim 1, wherein the image display system is a head-mounted type.

5. An image display system as claimed in claim 4, wherein the right and left eye ocular optical systems include half-mirrors, respectively.

6. An image display system as claimed in claim 4, wherein the right and left eye ocular optical systems include a concave mirror and a half-mirror, respectively.

7. An image display system as claimed in claim 6, wherein the half-mirror is included in a prism.

8. An image display system as claimed in claim 7, wherein the prism is formed by plastics.

* * * * *